Figure 6:
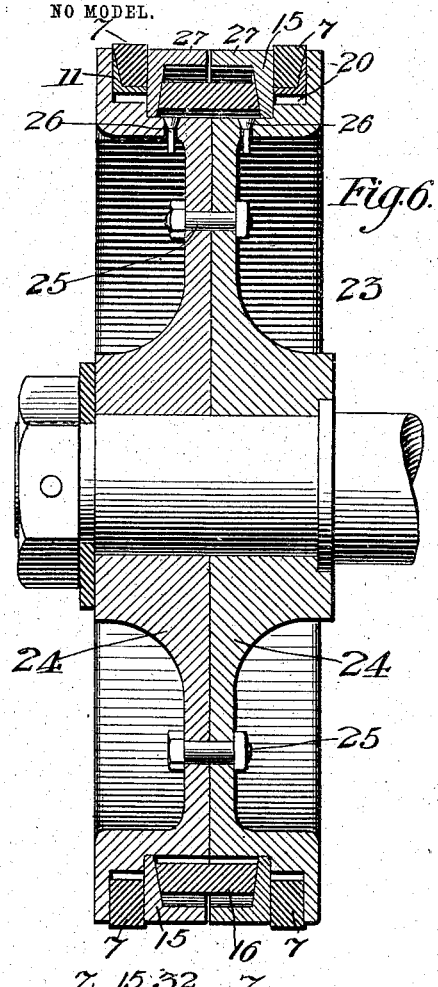

No. 719,630. PATENTED FEB. 3, 1903.
J. T. WILSON.
PISTON PACKING.
APPLICATION FILED MAY 12, 1900.
NO MODEL. 2 SHEETS—SHEET 1.
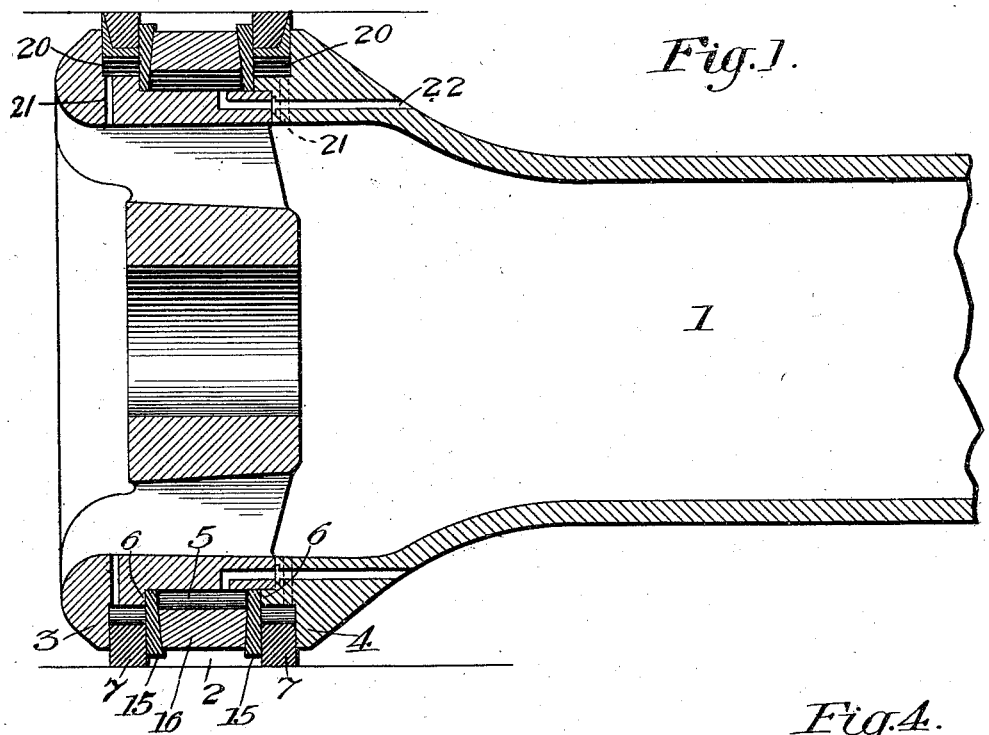
Fig. 1.
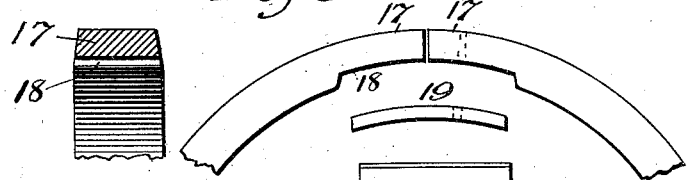
Fig. 5. Fig. 4.
Fig. 2. Fig. 3.
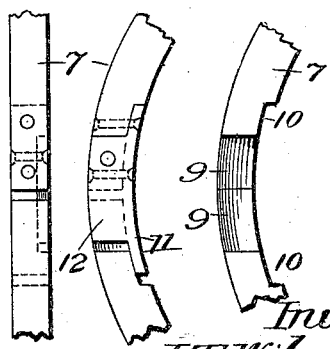
Witnesses:
O. W. Edelin.
Chas. H. Baker.
Inventor
J. T. Wilson.
By F. E. Stebbins,
Atty.

No. 719,630. PATENTED FEB. 3, 1903.
J. T. WILSON.
PISTON PACKING.
APPLICATION FILED MAY 12, 1900.
NO MODEL. 2 SHEETS—SHEET 2.

Witnesses:
D. W. Edelin.
Chas. H. Baker.

Inventor
J. T. Wilson.
By F. E. Stebbins,
Atty.

UNITED STATES PATENT OFFICE.

JOHN T. WILSON, OF JERSEY SHORE, PENNSYLVANIA.

PISTON-PACKING.

SPECIFICATION forming part of Letters Patent No. 719,630, dated February 3, 1903.

Application filed May 12, 1900. Serial No. 16,409. (No model.)

*To all whom it may concern:*

Be it known that I, JOHN T. WILSON, a citizen of the United States, residing at Jersey Shore, in the county of Lycoming and State of Pennsylvania, have invented a certain new and useful Piston-Packing, of which the following is a specification.

The object of my invention is the production of a piston-packing for piston-valves and pistons which shall have the packing ring or rings so constructed and arranged that when the engine is working steam or other fluid motive power the position of the ring or the positions of the rings relative to the bushing or inner surface of the cylinder will remain substantially unchanged throughout the entire stroke of the piston-valve or piston and the degree of frictional pressure of the outer or circumferential surface of a ring against the inner surface of a bushing or cylinder be substantially constant, which shall have the packing so constructed and arranged that when the engine is working steam the packing ring or rings will be rendered substantially solid or rigid, which shall have the packing so constructed and arranged that steam or other motive fluid cannot come in contact with the inner surface of a packing-ring and force it outwardly against a bushing or the inner surface of a cylinder and cause excessive friction, which shall have the packing so constructed and arranged that when the engine is not working steam the packing-ring will automatically adjust itself to the inner surface of the bushing or cylinder, and thus compensate for wear, and which, finally, shall have the packing so constructed and arranged that it will be durable and efficient, obviate the necessity of special adjustment by hand, and, withal, possess many other desirable features and characteristics constituting the same a superior instrumentality for performing the requisite functions.

With the above ends in view my invention consists of a packing embracing a packing-ring and a wedge-ring relatively so disposed that when motive fluid is admitted to the engine it will be excluded from the inner surface of the packing-ring, but will act upon the wedge-ring and change its diameter and by pressure render the packing-ring substantially rigid or solid.

It further consists in a packing comprising a packing-ring, a clamping-ring, and a wedge-ring.

Finally, it consists in certain novelties of construction and combinations and arrangements of parts hereinafter set forth and claimed.

The accompanying drawings illustrate six pictured examples of the physical embodiment of my invention, which are constructed and arranged according to the best of the several modes I have so far devised for the application of the principle.

Figure 7:
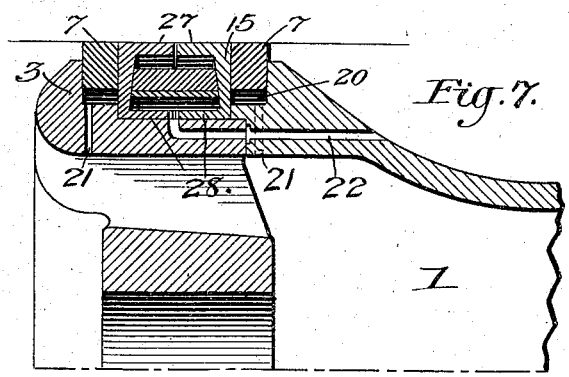
Figure 8:
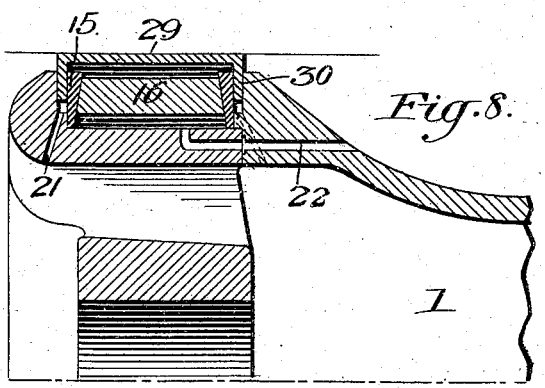
Figure 9:
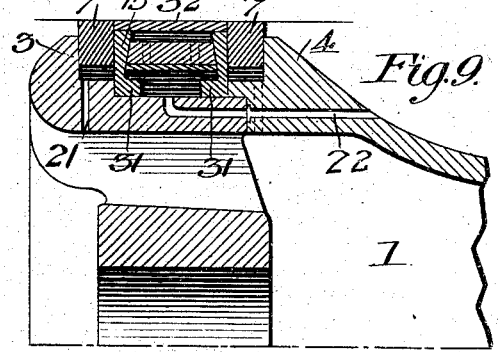
Figure 10:
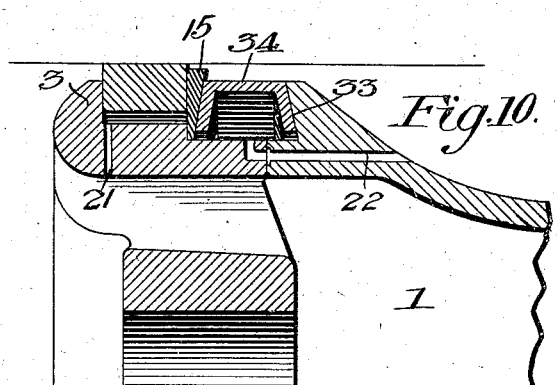

Figure 1 is a sectional view of a piston-valve, showing the relative positions of the packing-rings, clamping-rings, and wedge-ring and the motive-fluid inlet and exhaust passages. Fig. 2 illustrates certain details of the construction of a lap-joint for a packing or snap ring. Fig. 3 illustrates further constructive details of the packing-ring. Fig. 4 is a fragment of a clamping-ring shown in section and of a tapering shape, one face being beveled. Fig. 5 illustrates the constructive details of a lap-joint for a wedge-ring. Fig. 6 is a sectional view of an engine-piston with my improved packing applied in operative position and also showing a modified form of clamping-ring. Fig. 7 is a sectional view of a piston-valve, showing another modified form of clamping-ring. Fig. 8 illustrates in section a part of a piston-valve having a modified form of packing or snap ring, in combination with a wedge-ring and clamping-rings. Fig. 9 shows a section of a piston-valve having another modified form of clamping-ring and a supplemental ring. Fig. 10 illustrates a section of a piston-valve having a single packing-ring, a clamping-ring, and a wedge-ring.

Referring to the several figures, the numeral 1 designates a part of a piston-valve, which is of a well-known construction aside from my improvements; 2, a circumferential groove at one end of the valve; 3, the outer wall of the groove; 4, the inner wall of the groove;

5, a supplemental circumferential groove within the groove 2, above specified, and 6 the walls of the supplementary groove.

The numeral 7 designates a packing or snap ring of any desirable shape, size, or material located within the groove 2 and in contact with a wall thereof.

8 8 are the free ends of the packing-ring; 9 9, the beveled side surfaces of the free ends of the ring; 10 10, recesses formed by cutting away the body of the ends of the ring on the interior thereof.

11 is a joint-plate for the free ends of the ring, and which fits the recesses 10 10 at the end; 12, the beveled flange of the joint-plate, which fits the beveled surfaces 9 9 of the ends of the ring.

13 13 are rivets which secure the plate 11 to one end of the ring, and 14 is a rivet which is passed through the beveled flange 12 and the end of the ring.

The numeral 15 designates a clamping-ring which is preferably made integral or so it cannot appreciably change its diameter when subjected to side pressure. It may, however, be otherwise constructed and arranged, so that it cannot excessively expand when forced against a packing-ring. The several examples show this ring beveled on one side.

The numeral 16 designates the wedge-ring, which has two beveled sides, though in certain cases only one side may be beveled.

17 17 are the free ends of the wedge-ring; 18 18, recesses formed by cutting away the ends of the ring on its inner surface.

19 is a beveled joint-plate fitting the recesses 18 18 at the ends of the ring; 20, a space below a packing or snap ring; 21, an exhaust-port leading from the space below the packing-ring to the exhaust side of a piston-valve, and 22 is a live-steam passage.

Referring to Fig. 6, the numeral 23 designates an ordinary engine-piston. 24 24 are the two halves of the piston; 25, bolts which unite the halves of the piston; 26 26, check-valves which allow motive fluid to pass to the under surface of the wedge-ring, but prevent its discharge, and 27 27 are circumferential flanges added to the clamping-rings shown in Fig. 1.

In Fig. 7 the clamping-rings are provided with outer flanges 27 27 and inner circumferential flanges 28 28.

In Fig. 8 a wide packing or snap ring 29 is shown provided with circumferential flanges 30 30, which are located between the walls of the piston-valve and the clamping-rings.

In Fig. 9 the clamping-rings are shown with inner circumferential flanges 31 31, and a supplemental ring 32 is added, which can take the weight of the piston, and thus in a measure prevent the excessive wear of the packing-rings.

In Fig. 10 the wall of the piston-valve is beveled at 33 to match the beveled edge of the wedge-ring 34, which is formed with a circumferential channel on its inner surface. Here a single wedge-ring and a single clamping-ring are employed in combination with a single packing-ring.

The mode of operation when motive fluid is admitted beneath the wedge-ring is substantially the same in all the examples.

In Figs. 1, 6, 7, and 9 the motive fluid presses upon the under surface of the wedge-ring and causes it to expand against the beveled surfaces of the clamping-rings, and these rings being rigid are forced sidewise against the packing or snap rings, which in turn are rigidly and solidly held against the walls of the groove in the piston-valve or piston. As the inner edge of each clamping-ring extends within the supplemental groove 5 and is in frictional contact with the wall 6, motive fluid cannot normally pass to the space 20 below the packing-ring. However, should any motive fluid leak past a clamping-ring it would be discharged to the exhaust side of the piston-valve by way of a passage 21. When motive fluid is cut off, the wedge-ring contracts and releases the clamping-rings and packing-rings, and the latter then automatically adjust themselves to the inner surface of the bushings or inner surface of the cylinder.

A modified detail of construction is introduced in the engine-piston shown by Fig. 6. In this example motive fluid is alternately admitted to opposite sides or faces of the piston. Two check-valves 26 26 are therefore added—one on each side of the web—which prevent the motive fluid exhausting from the space beneath the wedge-ring when the motive fluid is exhausted from either end of the cylinder.

In Fig. 8 the packing-ring is held in place by the clamping-rings being forced against the flanges 30 of the packing-ring, which can yield slightly, the action of steam upon the wedge-ring being the same as in the other examples.

In Fig. 10 a single packing-ring is shown, and the wedge-ring bears against a beveled clamping-ring and the beveled wall 33 of the piston-valve. The action here is obviously analogous to the action in the other examples.

In Figs. 6, 7, and 9 the clamping-rings are modified in form by the addition of outer circumferential flanges and in Figs. 7 and 9 by the further addition of inner circumferential flanges. These serve to stiffen the rings, and the outer circumferential flanges may be so located as to take the weight of the piston-valve or piston, and thus relieve the packing-rings from excessive wear. In Fig. 9 there is applied a supplemental ring 32, which performs the same function as the outer circumferential flanges of the clamping-rings in supporting the weight of the piston-valve or piston.

It will be observed that in all the examples motive fluid is normally excluded from the under surface of a packing-ring, that motive fluid when admitted acts upon the wedge-ring and changes its diameter, that the clamping-ring cannot appreciably change its diameter and force the packing-ring outwardly against the inner surface of a bushing or a cylinder, and that when motive fluid is cut off the packing-ring can automatically adjust itself to the inner surface of the cylinder or bushing.

While I have illustrated and described only six examples of the physical embodiment of my invention and in connection with piston-valves and an ordinary piston, I do not thereby intend to limit its scope to such pictured examples, inasmuch as the principle can be embodied by other modes and in a multiplicity of forms and combinations. In some cases I may employ one wedge-ring to hold two packing-rings or use a single wedge-ring to hold a single packing-ring, as illustrated by Fig. 10. The form or shape and dimensions and arrangements of the several rings may be changed and other styles of joint-plates selected when so desired. These and other modifications, as well as additions or omissions of parts or elements, I shall not regard as substantial departures, provided the mode of operation is attained.

What I claim is—

1. The combination with a piston or piston-valve, of a packing which embraces a packing-ring and a wedge-ring arranged in parallel planes and means for admitting motive fluid to the under side of the wedge-ring, the parts being so disposed that motive fluid can act upon the wedge-ring and change its diameter and hold the packing-ring substantially rigid.

2. The combination with a piston or piston-valve, of a packing-ring, an integral clamping-ring, and a wedge-ring; said rings being arranged so that motive fluid will act upon the wedge-ring and force it against the clamping-ring which in turn is adapted to bear against the packing-ring and hold it in a rigid position.

3. The combination with a piston or piston-valve, of a packing-ring, a clamping-ring, and a wedge-ring; said rings being in parallel planes, the clamping-ring being non-expansible and the other two rings expansible.

4. The combination with a piston or piston-valve, of a packing-ring, a non-expansible clamping-ring, and a wedge-ring; said rings being arranged in parallel planes and the non-expansible clamping-ring being interposed between the packing-ring and the wedge-ring in substance as set forth.

5. The combination with a piston or piston-valve, of two packing-rings; a wedge-ring between the two packing-rings; and means for admitting motive fluid to the wedge-ring and excluding it from the inner surfaces of the packing-rings.

6. The combination with a piston or piston-valve, of two packing-rings; two clamping-rings; and a wedge-ring.

7. The combination with a piston or piston-valve, of a packing-ring, a flanged clamping-ring, and a wedge-ring.

8. The combination with a piston or piston-valve, of a packing-ring, a clamping-ring, a wedge-ring, and supplemental means for supporting part of the weight of the piston or piston-valve within the cylinder.

9. The combination with a piston or piston-valve, of a packing-ring, two clamping-rings, and a wedge-ring.

10. The combination with a piston or piston-valve, of a packing-ring, a clamping-ring having outer and inner flanges, and a wedge-ring.

11. The combination with a piston or piston-packing, of a packing-ring, a clamping-ring having an inner flange, and a wedge-ring.

12. The combination with a piston or piston-valve, of a packing-ring, a beveled clamping-ring, and a wedge-ring.

13. The combination with a piston or piston-valve, of a packing-ring, and a wedge-ring, said rings located in parallel planes within a groove; said piston or piston-valve being provided with a motive-fluid-admission passage to the wedge-ring only; and means for excluding steam from the inner surface of the packing-ring.

14. The combination with a piston or piston-valve, of a packing-ring, and a wedge-ring; said piston or piston-valve being provided with a motive-fluid-admission passage to the wedge-ring, and an exhaust-passage from the inner side of the packing-ring.

15. The combination with a piston or piston-valve, of a packing-ring having a lap-joint, a rigid clamping-ring, said rings being arranged in parallel planes.

16. The combination with a piston or piston-valve, of two packing-rings, two non-expansible clamping-rings, and a wedge-ring.

17. The combination with a piston or piston-valve, of an expansible packing-ring, a non-expansible clamping-ring, and an expansible wedge-ring which bears against the clamping-ring.

In testimony whereof I affix my signature in presence of two witnesses.

JOHN T. WILSON.

Witnesses:
ATHAN N. COFFEY,
WM. H. DE LACY.